(12) United States Patent
Bringley et al.

(10) Patent No.: US 6,689,335 B1
(45) Date of Patent: Feb. 10, 2004

(54) SILVER ION SEQUESTER AND RELEASE AGENT

(75) Inventors: Joseph F. Bringley, Rochester, NY (US); Roger Lok, Hilton, NY (US); Nancy B. Liebert, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/324,234

(22) Filed: Dec. 19, 2002

(51) Int. Cl.$^7$ ............................................... C01B 15/16
(52) U.S. Cl. ...................................................... 423/309
(58) Field of Search ......................................... 423/309

(56) References Cited

U.S. PATENT DOCUMENTS

| | | | |
|---|---|---|---|
| 3,647,439 A | 3/1972 | Bass | 430/424 |
| 4,942,119 A | 7/1990 | Ozin et al. | 430/564 |
| 5,296,238 A | 3/1994 | Sugiura et al. | 424/604 |
| 5,441,717 A | * 8/1995 | Ohsumi et al. | 423/306 |
| 6,261,757 B1 | 7/2001 | Irving et al. | 430/566 |

FOREIGN PATENT DOCUMENTS

| | | |
|---|---|---|
| EP | 909 981 A1 | 4/1999 |
| JP | 3083906 | 4/1991 |

OTHER PUBLICATIONS

Abstract of JP 09324079 A, Dec. 16, 1997.*
Abstract of JP 03083905 A, Apr. 9, 1991.*
A. La Ginestra et al, "Ag–Zirconium Phosphate System-:Characterization Of The Phases Obtained At Different Temperatures", Mat. Res. Bull., vol. 14, No. 9, pp. 1099–1109, 1979.
A. Clearfield et al, "Synthesis Of Sodium Dizirconium Triphosphate From α–Zirconium Phosphate", Mat. Res. Bull., vol. 15, No. 11, pp. 1603–1610, 1980.
Abraham Clearfield and Soofin Cheng; "On The Mechanism Of Ion Exchange In Zirconium Phosphates–XXX"; *J. Inorg. Nucl. Chem.* vol. 42; pp. 1341–1345; 1980.
William R. Schleigh and William H. Faul; Research Disclosure 12924; Jan. 1975; "Incorporated Dye–Forming Blocked Developers"; pp. 27–30.
Co–pending, commonly assigned US Ser. No. 10/033,517; filed Dec. 28, 2001; titled Silver Halide Imaging Element Containing Sequestered Silver Ions; of Joseph F. Bringley et al.

* cited by examiner

*Primary Examiner*—Hoa Van Le
(74) *Attorney, Agent, or Firm*—Andrew J. Anderson

(57) ABSTRACT

A silver ion sequester and release agent is described which comprises a silver ion exchangeable material of the formula:

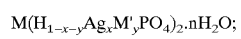

$$M(H_{1-x-y}Ag_xM'_yPO_4)_2 \cdot nH_2O;$$

where M is Zr, Ti, Sn, Ge or Hf or any combination thereof; M' is an Alkali or alkaline earth metal; x is a number from 0.10 to 0.80; y is a number from 0.15 to 0.85; (x+y) is a number from 0.25 to 0.95; and n is a rational number between 0 and 10. Processes for preparing such silver ion sequester and release agent material are also described comprising combining in an aqueous medium a crystalline or amorphous metal hydrogen phosphate ion exchange host material of the formula $M(HPO_4)_2 \cdot nH_2O$ with less than 2 molar equivalents of silver ions relative to the amount of ion exchange host material such that silver ions are exchanged for protons in the host material, and adding a base compound to the aqueous medium to achieve a pH of at least 4.4 and sequester at least 95% of the combined silver ions into the host material. Further described are photographic elements comprising a support bearing one or more hydrophilic colloid layers including at least one photographic silver halide emulsion layer, wherein one or more layers contain such a silver ion sequester and release agent which sequesters silver ions prior to photographic processing and releases silver ions upon exposure to photographic processing solutions.

34 Claims, No Drawings

SILVER ION SEQUESTER AND RELEASE AGENT

FIELD OF THE INVENTION

The present invention relates to silver ion sequester and release agent compositions, to a process for the preparation thereof, and to photographic elements containing sequestered silver ions which may be released upon exposure to photographic processing solutions.

BACKGROUND OF THE INVENTION

The photographic system, in its most basic form, is comprised of silver halide (capable of detecting light and storing it as latent image) and developer molecules (capable of converting the latent image to a visible image). These two chemistries, however, are incompatible, as unexposed silver halide is thermodynamically unstable with respect to reduction in the presence of developer molecules. The consequence of this is that modern photography typically requires multiple steps: exposure and processing.

The effect of Ag ion upon the photographic system has long been a topic of study (see, e.g., "The Theory of the Photographic Process", T. H. James, ed.; 4$^{th}$ ed., Chapter 13, 1977). Control of the Ag ion concentration is known to be important in the manufacture of silver halide emulsions, and in the production and processing of silver halide imaging elements. Most notably, the introduction of Ag ion into a silver halide imaging element may induce a phenomenon known as "solution physical development", in which silver ion in solution is adsorbed onto developing silver halide grains. The silver ion is then reduced by the developer, forming silver metal, and thereby can advantageously add to the overall density of the image. This process, however, is most often indiscriminate and leads to the build-up of fog in the system with no net gain in imaging efficiency. As a result of this, solution physical development process is generally avoided in most photographic systems, with the exception of some reversal processes. It would be desirable to provide photographic materials in which silver ions are effectively sequestered prior to photographic processing, so as to minimize build up of fog density, and which are released upon introduction of common photographic processing solutions and made available for enhancement of the photographic image.

Incorporation of active chemistry directly into film formulations, to either simplify or improve processing after exposure, has long been a goal in the photographic industry. Some photographically useful compounds are difficult to incorporate in a stable fashion into a light-sensitive material, however, or cause serious deterioration in the photographic capability if incorporated. These compounds, if incorporated directly into the photographic elements, typically need to be stabilized or rendered harmless by chemical modification prior to photographic processing. Methods of incorporating development and other active chemistries into photographic element formulations have been described in a number of patents and publications. Schleigh and Faul, in Research Disclosure 129 (1975) describe methods of appending color developers with "blocking" chemistry to prevent premature reaction. U.S. Pat. No. 6,261,757 to Irving et al. describes photographic articles in which developers and other photographic chemistries are ionically bound to the surface of ion-exchange resins.

U.S. Pat. No. 4,942,119 discloses materials comprising radiation sensitive silver compositions entrapped or encapsulated in the cages of a microporous sodalite lattice, prepared from synthetic sodium sodalites by a silver ion exchange process. There is no disclosure, however, of the use of such materials as a source of silver ions during processing of a photographic element comprising a silver halide emulsion.

EP 0 909 981 discloses silver halide photographic materials comprising zeolites loaded with a photographically useful group. Use of zeolites loaded with aqueous soluble silver salts and halide salts for the in situ preparation of ultramicrocrystalline silver halides for ripening onto coarser silver halide grains in a reaction vessel is also disclosed, but there is no disclosure of the use of such materials to incorporate sequestered silver ions which are to be released during processing of a photographic element.

Clearfield and Cheng (*J. Inorg. Nucl. Chem.*, 42, 1341 (1980)) have reported compositions and methods of preparing the following materials: $Zr(AgPO_4)_2 \cdot H_2O$, $ZrAg_{0.22}H_{1.78}(PO_4)_2$ and $ZrAg_{0.75}H_{1.25}(PO_4)_2$. There is no disclosure, however, of the use of such materials as a source of silver ions during processing of a photographic element comprising a silver halide emulsion.

Copending, commonly assigned, Bringley et al. U.S. Ser. No. 10/033,517, filed Dec. 28, 2001, describes a photographic material wherein sequestered silver ions are incorporated into at least one hydrophilic colloid layer in the form of a silver ion containing material which sequesters silver ions prior to photographic processing (so as to minimize the generation of photographic fog) and releases silver ions upon exposure to photographic processing solutions (so as to result in an observed increase in photographic speed or developability). In one embodiment, the silver ion containing material may comprise a silver ion-exchanged intercalation composition comprising a layered host material having silver ions inserted as guest ions between the layers of the host material. In a particular described embodiment, the silver ion containing composition host material may comprise a layered metal hydrogen phosphate composition, and the resulting silver ion containing material comprises a silver ion exchangeable material of the formula:

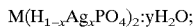

$M(H_{1-x}Ag_xPO_4)_2 \cdot yH_2O$;

where M is Zr, Ti, Sn, Ge or Hf or any combination thereof; x is a number from 0 to 1; and y is a rational number between 0 and 10.

The ability of host materials to sequester silver ion in photographic elements as described in U.S. Ser. No. 10/033,517 is directly related to levels of observed fog increase, especially upon prolonged keeping of the element. Also, to minimize the addition of non-sequestered silver ion along with the silver ion exchangeable material, such materials need to be prepared of in a form which is practically free of non-sequestered residual silver ions. The referenced copending application describes the preparation of such materials by combining the host material and silver ions such that the silver ions can be ion exchanged into the host material, and subsequently washing and/or filtering of the combination to remove non-sequestered residual silver ions. It would be desirable to provide silver ion containing materials which demonstrate improved silver ion sequesterability. It would also be desirable to provide silver ion containing materials which may be prepared for similar uses in a more efficient process which would not require residual silver ion removal steps.

SUMMARY OF THE INVENTION

In accordance with one embodiment of the invention, a silver ion sequester and release agent is described which comprises a silver ion exchangeable material of the formula:

$M(H_{1-x-y}Ag_xM'_yPO_4)_2 \cdot nH_2O$;

where M is Zr, Ti, Sn, Ge or Hf or any combination thereof, M' is an alkali or alkaline earth metal; x is a number from 0.10 to 0.80; y is a number from 0.15 to 0.85; (x+y) is a number from 0.25 to 0.95; and n is a rational number between 0 and 10. The invention is also directed at processes for preparing such silver ion sequester and release agent material comprising combining in an aqueous medium a crystalline or amorphous metal hydrogen phosphate ion exchange host material of the formula $M(HPO_4)_2 \cdot nH_2O$ with less than 2 molar equivalents of silver ions relative to the amount of ion exchange host material such that silver ions are exchanged for protons in the host material, and adding a base compound to the aqueous medium to achieve a pH of at least 4.4 and sequester at least 95% of the combined silver ions into the host material. The invention is further directed towards compositions comprising particles of such silver ion sequester and release agent material in an aqueous medium at pH of at least 4.4.

The invention is also directed towards photographic elements comprising a support bearing one or more hydrophilic colloid layers including at least one photographic silver halide emulsion layer, wherein one or more layers contain such a silver ion sequester and release agent which sequesters silver ions prior to photographic processing and releases silver ions upon exposure to photographic processing solutions, and to methods of processing such a photographic material after exposure comprising contacting the photographic material with a photographic processing solution having a greater concentration of cations other than silver ions relative to the silver ion sequester and release agent such that a cation concentration gradient is established, and releasing silver ions from the silver ion sequester and release agent by ion exchange with the silver ion sequester and release agent.

DETAILED DESCRIPTION OF THE INVENTION

The present invention describes unique silver ion sequester and release agents, their preparation and compositional dependence such that the silver ion sequesterability of the ion exchange compound is improved. The improved sequesterability may potentially be utilized not only in photographic applications, but also with respect to antimicrobial applications of the silver ion sequester release agent. In this case, the controlled release of silver ion is used to prevent bacterial, viral and fungi growth in food contact materials and in human tissue. Photographically, the inventions show improved speed and minimum density characteristics and improved keeping when compared to previously disclosed materials. The invention further describes an improved method of preparation of the sequester/release agent which does not require subsequent purification. The method greatly simplifies the preparation of the silver ion exchange compound and eliminates costly and time consuming manufacturing steps such as filtration and washing.

Silver ion sequester and release agent materials of the invention comprise metal hydrogen phosphate compositions which have specified fractions of silver ion and at least one additional metal ion exchanged therein. Such materials are specifically of the formula:

$M(H_{1-x-y}Ag_xM'_yPO_4)_2 \cdot nH_2O$;

where M is Zr, Ti, Sn, Ge or Hf or any combination thereof; M' is an alkali or alkaline earth metal; x is a number from 0.10 to 0.80; y is a number from 0.15 to 0.85; (x+y) is a number from 0.25 to 0.95; and n is a rational number between 0 and 10. In a preferred embodiment of the invention, x is between 0.15 and 0.70, y is between 0.15 and 0.50, and(x+y) is between 0.30 and 0.95. In a more preferred embodiment, x is between 0.20 and 0.60, y is between 0.20 and 0.50, and (x+y) is between 0.40 and 0.95. It is preferred though not necessary that the silver ion exchangeable material be insoluble in water and have an average particle size between 0.01 and 10.0 $\mu$m, and more preferably between 0.05 and 1.0 $\mu$m.

Silver ions may be sequestered in layered host materials by various procedures. In a typical preparation a solid host compound having a particle size of less than 50 $\mu$m, and preferable less than 10 $\mu$m, and more preferably less than 1 $\mu$m is added to distilled water and a suspension is formed by rapid stirring. The aqueous medium may comprise plain water, or a hydrophilic colloid composition. The silver ion to be intercalated or ion exchanged is then added to the suspension. The mixture is allowed to stir for many hours or until the intercalation or ion exchange process is complete. Gentle heating may be applied to the mixture to accelerate the process if necessary. Non-aqueous solvents or mixtures may also be employed to carry out the reaction. The reaction progress may be monitored using powder X-ray diffraction and other analytical techniques. Powder X-ray diffraction provides direct information regarding the average distance between two adjacent layers of a layered host compound, commonly called the interlayer spacing. As intercalation proceeds the guest ions enter between the layers and thus the interlayer spacing typically increases to account for the guest ions. The interlayer spacing typically increases in direct proportion to the size of the guest. Other analytical techniques such as elemental analysis may be used to confirm the extent of reaction.

In accordance with a specific embodiment of the invention, silver ion sequester and release agent material is prepared by combining in an aqueous medium a crystalline or amorphous metal hydrogen phosphate ion exchange host material of the formula $M(HPO_4)_2 \cdot nH_2O$ with less than 2 molar equivalents of silver ions relative to the amount of ion exchange host material such that silver ions are exchanged for protons in the host material, and adding a base compound to the aqueous medium to achieve a pH of at least 4.4 and sequester at least 95% of the combined silver ions into the host material. The base compound conveniently may be selected to provide the M' Alkali or alkaline earth metal incorporated into the sequester and release agent materials of the invention, as well as to control pH to desired levels. In a particular example the base compound is NaOH. Other base compounds which may be used include KOH, LiOH, RbOH, CsOH, $Mg(OH)_2$, $Ca(OH)_2$, or metal acetate salts such as sodium or potassium acetate, or organic bases such as ammonium hydroxide, tetramethyammonium hydroxide, tetraethylammonium hydroxide, hydroxyl amine, and pyridine. Silver may conveniently be added in any salt form such as silver nitrate or silver acetate, silver perchlorate or other aqueously soluble silver salt. The fraction uptake of silver ion by such host materials increases as the pH of the suspension is increased, and the host material sequesters silver ion more effectively at higher pH. These results can be understood if one considers ion exchange processes described by equations (1) and (2) below for the combination of zirconium hydrogen phosphate and silver ions in an aqueous medium. In equation (1), no base compound is added, while in equation (2) NaOH is added:

$$Zr(HPO_4)_2 \cdot H_2O + x\ Ag^+ \leftrightarrow Zr(H_{1-x}Ag_xPO_4)_2 \cdot H_2O + x\ H^+ \quad (1)$$

$$Zr(HPO_4)_2 \cdot H_2O + x\ Ag^+ + y\ NA^+OH^- \leftrightarrow Zr(H_{1-x-y}Ag_xNa_yPO_4)_2 \cdot H_2O + H_2O \quad (2)$$

In each equation, an equilibrium is established within the ion exchange host between silver ions and exchanged protons. In equation (1), as the concentration of silver ion is increased, only a fraction of the silver ion is exchanged since the subsequent increasing concentration of protons (lower pH) pushes the equilibrium in the backward direction. Further, because $Zr(HPO_4)_2 \cdot H_2O$ is an acidic solid, the equilibrium cannot be effectively moved in the forward direction simply by adding additional host exchange material. In equation 2, an equilibrium is established between silver ions, exchanged protons and sodium ions introduced with the base compound. The addition of a base compound (NaOH) pushes the equilibrium in the forward direction, since the added hydroxide ion reacts with exchanged protons to form water. This fact is important because it improves the silver ion sequesterability of the host exchanger, and since virtually all of the silver ions may be sequestered such that there is no need to wash the product free of unabsorbed silver ions which can be a costly operation. In accordance with preferred embodiments of the invention, sufficient base compound is add to the aqueous medium during preparation of the silver ion sequester and release agent to achieve a pH of at least 4.4 (more preferably at least 5.0, and most preferably at least 5.2), and at least 95% (more preferably at least 98%, and most preferably at least 99%) of the combined silver ions are sequestered into the host material. While upper pH limits are not as critical, pH of below 10, and more preferably below 8, are preferred to avoid the presence of excess base cations which may compete with silver ions for incorporation into the host material.

Compositions of silver ion containing materials prepared in accordance with the invention may be incorporated in photographic element hydrophilic colloid layer coating compositions. The composition may be added as a free solid or may be prepared by dispersing the solid into water or non-aqueous medium or into an aqueous hydrophilic colloid medium such as gelatin, or into a hydrophobic or hydrophilic polymer medium. A typical photographic light-sensitive material is based on hydrophilic colloid layers comprising silver halide emulsion compositions, though other types of materials are known using various other kinds of light-sensitive components. The silver ion containing compositions may be incorporated into a light sensitive emulsion layer or any other hydrophilic colloid layer which may be in association with a light sensitive emulsion layer. While improved results with respect to increased photographic speed, upper scale density, and/or contrast may be obtained over a wide coverage range of incorporated silver ions, in order to minimize adverse consequences with respect to increases in fog density it is preferred to utilize the silver ion containing materials at levels which provide less than or equal to about 5 wt % incorporated sequestered silver ions, more preferably less than or equal to about 4 wt % and most preferably less than or equal to about 3 wt %, relative to the weight of silver of the silver halide emulsions of the element. Preferred levels of incorporated sequestered silver ions are from about 0.01 to 5 wt %, more preferably from about 0.05 to 4 wt % and most preferably from about 0.1 to 3 wt %, relative to the weight of silver of the silver halide emulsion of the emulsion layer with which the silver ion containing material is associated.

Silver ion containing compositions prepared in accordance with the invention may be useful for single color elements (including black and white) or multicolor photographic elements. Silver halide multicolor elements typically contain a support and image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer. Various arrangements and constructions of silver halide color photographic materials may be employed for different types of imaging processes including, for example, diffusion transfer color photography and silver dye bleach color photography. Mixed grain photographic products and multilayer products are also known.

A typical multicolor photographic element comprises a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. The element can contain additional layers, such as filter layers, interlayers, overcoat layers, subbing layers, and the like. If desired, a photographic element containing a dispersed photographically useful compound in accordance with the invention can be used in conjunction with an applied magnetic layer as described in *Research Disclosure*, Nov. 1992, Item 34390 published by Kenneth Mason Publications, Ltd., Dudley House, 12 North Street, Emsworth, Hampshire P010 7DQ, ENGLAND.

Suitable materials for use in photographic emulsions and elements that can be used in conjunction with silver ion containing compositions prepared in accordance with the invention are further described in *Research Disclosure*, September 1994, Item 36544, available as described above, hereinafter referred to as *Research Disclosure I*. The contents of the *Research Disclosure I*, including the patents and publications referenced therein, are incorporated herein by reference, and the Sections hereafter referred to are Sections of the *Research Disclosure*, Item 36544. Silver halide emulsions which may be employed in photographic elements can be either negative-working or positive-working. Suitable emulsions and their preparation as well as methods of chemical and spectral sensitization are described in Sections I, and III–IV. Vehicles and vehicle related addenda are described in Section II. Dye image formers and modifiers are described in Section X. Various additives such as UV dyes, brighteners, luminescent dyes, antifoggants, stabilizers, light absorbing and scattering materials, coating aids, plasticizers, lubricants, antistats and matting agents are described, for example, in Sections VI–IX. Layers and layer arrangements, color negative and color positive features, scan facilitating features, supports, exposure and processing can be found in Sections XI–XX. It is also specifically contemplated that the materials and processes described in an article titled "Typical and Preferred Color Paper, Color Negative, and Color Reversal Photographic Elements and Processing," published in *Research Disclosure*, February 1995, Volume 370 may also be advantageously used with elements prepared in accordance with the invention. It is further specifically contemplated that the elements of the invention may further be used in combination with the various photographic compounds and systems such as described in U.S. Pat. No. 6,261,757 to Irving, et al., the disclosure of which is incorporated herein.

The silver halide emulsion grains to be used in the silver halide emulsion layer may be of tabular or non-tabular shape, and may be prepared according to methods known in the art, such as those described in *Research Disclosure I* and James, *The Theory of the Photographic Process*. These include methods such as ammoniacal emulsion making, neutral or acidic emulsion making, and others known in the art. These methods generally involve mixing a water soluble silver salt with a water soluble halide salt in the presence of a protective colloid, and controlling the temperature, pAg, pH values, etc, at suitable values during formation of the silver halide by precipitation. While any conventional combinations of chloride, bromide, and iodide ions may be employed in formation of silver halide emulsion grains for use in the elements of the present invention, in a preferred embodiment the element comprises a color paper print element and the silver halide emulsion layer comprises a high chloride (i.e., greater than 50 mole percent chloride, based on total silver, preferably greater than 70 mole percent chloride and more preferably greater than 90 mole percent chloride) silver halide emulsion. Use of the silver ion containing compositions described herein have been found to be particularly effective at increasing photographic speed, developability, and upper scale density without the build-up of fog in the system for color print elements comprising high chloride emulsions which are subjected to conventional color paper processing solutions.

Photographic elements typically provide silver halide in the form of an emulsion. The hydrophilic colloid in the hydrophilic colloid layers is a binder or protective colloid for the usual silver halide photographic light-sensitive materials. Such hydrophilic colloids also function as a vehicle for coating the emulsion as a layer of a photographic element. Useful hydrophilic colloid vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin, phthalated gelatin, and the like), and others as described in *Research Disclosure I*. Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, and the like, as described in *Research Disclosure I*. The vehicle can be present in the emulsion in any amount useful in photographic emulsions. The emulsion can also include any of the addenda known to be useful in photographic emulsions. The silver halide may be advantageously subjected to chemical sensitization with noble metal (for example, gold) sensitizers, middle chalcogen (for example, sulfur) sensitizers, reduction sensitizers and others known in the art. These chemical sensitizers include active gelatin, sulfur, selenium, tellurium, gold, platinum, palladium, iridium, osmium, rhenium, phosphorous, or combinations thereof. Compounds and techniques useful for chemical sensitization of silver halide are known in the art and described in *Research Disclosure I* and the references cited therein. Chemical sensitization is generally carried out at pAg levels of from 5 to 10, pH levels of from 5 to 8, and temperatures of from 30 to 80° C., as illustrated in *Research Disclosure*, June 1975, item 13452 and U.S. Pat. No. 3,772,031.

The silver halide may be spectrally sensitized by sensitizing dyes by any method known in the art, such as described in *Research Disclosure I*. The dye may be added to an emulsion of the silver halide grains and a hydrophilic colloid at any time prior to (e.g., during or after chemical sensitization) or simultaneous with the coating of the emulsion on a photographic element. The dye/silver halide emulsion may be mixed with a dispersion of color image-forming coupler immediately before coating or in advance of coating (for example, 2 hours).

Photographic elements are preferably imagewise exposed using any of the known techniques, including those described in *Research Disclosure I*, section XVI. This typically involves exposure to light in the visible region of the spectrum, and typically such exposure is of a live image through a lens, although exposure can also be exposure to a stored image (such as a computer stored image) by means of light emitting devices (such as light emitting diodes, CRT and the like).

In accordance with a particular embodiment of the invention, silver ions which are sequestered in the silver ion containing materials described herein can advantageously be released from the host materials upon exposure to a processing solution having a greater local concentration of cations (other than silver ions) than the silver ion exchangeable material such that a cation concentration gradient is established to drive cation exchange and release of the sequestered silver ions. Alternatively, silver ions may be released from the silver ion containing materials upon a change in pH, or by other means such as heating or introduction of electrical current during processing. Developer processing solutions are typically both basic and contain a high concentration of cations and anions so as to facilitate release of the silver ions.

Photographic elements can be processed in any of a number of well-known photographic processes utilizing any of a number of well-known processing compositions, described, for example, in *Research Disclosure* referenced above, or in T. H. James, editor, *The Theory of the Photographic Process*, 4$^{th}$ Edition, Macmillan, New York, 1977. In the case of processing a negative working element, the element is treated with a color developer (that is one which will form the colored image dyes with the color couplers), and then with a oxidizer and a solvent to remove silver and silver halide. In the case of processing a reversal color element, the element is first treated with a black and white developer (that is, a developer which does not form colored dyes with the coupler compounds) followed by a treatment to fog unexposed silver halide (usually chemical or light fogging), followed by treatment with a color developer. Preferred color developing agents are p-phenylenediamines. Especially preferred are: 4-amino-N,N-diethylaniline hydrochloride, 4-amino-3-methyl-N,N-diethylaniline hydrochloride, 4-amino-3-methyl-N-ethyl-N-(b-(methanesulfonamido)ethylaniline sesquisulfate hydrate, 4-amino-3-methyl-N-ethyl-N-(b-hydroxyethyl)aniline sulfate, 4-amino-3-b-(methanesulfonamido)ethyl-N,N-diethylaniline hydrochloride and 4-amino-N-ethyl-N-(2-methoxyethyl)-m-toluidine di-p-toluene sulfonic acid.

Development is typically followed by bleach-fixing, to remove silver or silver halide, washing and drying. Bleaching and fixing can be performed with any of the materials known to be used for that purpose. Bleach baths generally comprise an aqueous solution of an oxidizing agent such as water soluble salts and complexes of iron (III)(e.g., potassium ferricyanide, ferric chloride, ammonium or potassium salts of ferric ethylenediaminetetraacetic acid), water-soluble persulfates (e.g., potassium, sodium, or ammonium persulfate), water-soluble dichromates (e.g., potassium, sodium, and lithium dichromate), and the like. Fixing baths generally comprise an aqueous solution of compounds that form soluble salts with silver ions, such as sodium thiosulfate, ammonium thiosulfate, potassium thiocyanate, sodium thiocyanate, thiourea, and the like.

Photographic elements may also be processed in amplification processes that use developer/amplifier solutions described in U.S. Pat. No. 5,324,624, for example. When processed in this way, the low volume, thin tank processing system and apparatus described in U.S. Pat. No. 5,436,118 preferably is employed.

EXAMPLES

Examples 1–15

Silver ion sequester and release agent material comparison examples 1–5 and invention examples 6–15 were prepared as follows:

Comparison Example C1

In to a 50.0 ml Erlenmeyer flask was added 20.6 ml of water and 0.5 g of α-Zr(HPO$_4$)$_2$.H$_2$O. While the suspension was stirring, 2.2 ml each of 1.5 M $AgNO_3$ and 1.5 M NaAcetate were added. The suspension was stirred for 24 hours and a 10.0 ml aliquot was centrifuged and the supernatant solution analyzed for residual (non-sequestered) silver and sodium ion by ICP-AES. The results are given in Table I. The nominal silver and sodium ion concentrations were 14,239 μg/g and 3036 μg/g, respectively.

Comparison Example C2

Performed in an identical manner to that of comparison example 1, except that 1.0 g of $\alpha$-$Zr(HPO_4)_2 \cdot H_2O$ added to the reaction mixture.

Comparison Example C3

Performed in an identical manner to that of comparison example 1, except that 2.0 g of $\alpha$-$Zr(HPO_4)_2 \cdot H_2O$ added to the reaction mixture.

Comparison Example C4

Performed in an identical manner to that of comparison example 1, except that 4.0 g of $\alpha$-$Zr(HPO_4)_2 \cdot H_2O$ added to the reaction mixture.

Comparison Example C5

Into a 50.0 ml Erlenmeyer flask was added 25.0 ml of distilled water, 1.0 g of $\alpha$-$Zr(HPO_4)_2 \cdot H_2O$ and 1.35 ml of 2.5 N NaOH. While the suspension was stirring, to each flask was then added, 2.2 ml of 1.5 M $AgNO_3$ and the contents allowed to stir for 1.5 hr. The pH was then adjusted to 4.3 by the careful addition of 0.25 N NaOH. The suspension was stirred for 24 hours and a 10.0 ml aliquot was centrifuged and the supernatant solution analyzed for silver and sodium ion by ICP-AES. The results are given in Table I. The nominal silver and sodium ion concentrations were 11,870 μg/g and 2870 μg/g, respectively.

Invention Example E6

Performed in an identical manner to that of example 5 except that the pH was adjusted to 4.8. The nominal silver and sodium ion concentrations were then 11,120 μg/g and 3030 μg/g, respectively.

Invention Example E7

Performed in an identical manner to that of example 5 except that the pH was adjusted to 5.2. The nominal silver and sodium ion concentrations were then 11,090 μg/g and 3040 μg/g, respectively.

Invention Example E8

Performed in an identical manner to that of example 5 except that the pH was adjusted to 6.0. The nominal silver and sodium ion concentrations were then 10,660 μg/and 3150 μg/g, respectively.

Invention Example E9

Into a 50.0 ml Erlenmeyer flask was added 25.0 ml of distilled water, 1.33 g of $\alpha$-$Zr(HPO_4)_2 \cdot H_2O$ and 1.77 ml of 2.5 N NaOH. While the suspension was stirring, to each flask was then added, 2.2 ml of 1.5 M $AgNO_3$ and the contents allowed to stir for 1.5 hr. The pH was then adjusted to 4.4 by the careful addition of 0.25 N NaOH. The suspension was stirred for 24 hours and a 10.0 ml aliquot was centrifuged and the supernatant solution analyzed for silver and sodium ion by ICP-AES. The results are given in Table I. The nominal silver and sodium ion concentrations were 12,190 μg/g and 3530 μg/g, respectively.

Invention Example E10

Performed in an identical manner to that of example 9 except that the pH was adjusted to 4.9. The nominal silver and sodium ion concentrations were then 11,670 μg/g and 3620 μg/g, respectively.

Invention Example E11

Performed in an identical manner to that of example 9 except that the pH was adjusted to 5.3. The nominal silver and sodium ion concentrations were then 11,340 μg/g and 3680 μg/g, respectively.

Invention Example E12

Performed in an identical manner to that of example 9 except that the pH was adjusted to 5.7. The nominal silver and sodium ion concentrations were then 10,790 μg/g and 3780 μg/g, respectively.

Invention Example E13

Into a 50.0 ml Erlenmeyer flask was added 25.0 ml of distilled water, 2.00 g of $\alpha$-$Zr(HPO_4)_2 \cdot H_2O$ and 2.7 ml of 2.5 N NaOH. While the suspension was stirring, to each flask was then added, 2.2 ml of 1.5 M $AgNO_3$ and the contents allowed to stir for 1.5 hr. The pH was then adjusted to 5.2 by the careful addition of 0.25 N NaOH. The suspension was stirred for 24 hours and a 10.0 ml aliquot was centrifuged and the supernatant solution analyzed for silver and sodium ion by ICP-AES. The results are given in Table I. The nominal silver and sodium ion concentrations were 11,910 μg/g and 5190 μg/g, respectively.

Invention Example E14

Performed in an identical manner to that of example 13 except that the pH was adjusted to 5.4. The nominal silver and sodium ion concentrations were then 11,410 μg/g and 5220 μg/g, respectively.

Invention Example E15

Performed in an identical manner to that of example 13 except that the pH was adjusted to 5.9. The nominal silver and sodium ion concentrations were then 10,850 μg/g and 5240 μg/g, respectively.

The final chemical composition $Zr(H_{1-x-y}Ag_xNa_yPO_4)_2 \cdot H_2O$ of the resulting exchange reagent for each of Examples 1–15 can be calculated by noting the fraction uptake of the added silver and sodium ions and calculating the proton composition by difference. The calculated values of x and y in such formula for each Example are also given in Table I.

TABLE I

| Ex. | Fraction loading* | pH | Residual [Ag] μg/ml | Residual [Na] μg/ml | % uptake Ag | % uptake Na | x | y |
| --- | --- | --- | --- | --- | --- | --- | --- | --- |
| C1 | 100 | 3.56 | 1248 | 2270 | 91.2 | 25.2 | 0.90 | 0.10 |
| C2 | 50 | 2.76 | 1236 | 2322 | 91.3 | 23.5 | 0.45 | 0.11 |
| C3 | 25 | 2.57 | 2182 | 2434 | 84.7 | 19.8 | 0.21 | 0.05 |
| C4 | 12.5 | 2.44 | 3212 | 2243 | 77.4 | 23.9 | 0.10 | 0.03 |
| E5 | 50 | 4.3 | 753 | 2380 | 93.7 | 17.1 | 0.47 | 0.10 |
| E6 | 50 | 4.8 | 368 | 2210 | 96.7 | 27.1 | 0.48 | 0.17 |
| E7 | 50 | 5.2 | 206 | 2290 | 98.1 | 24.7 | 0.49 | 0.16 |
| E8 | 50 | 6.0 | 106 | 2170 | 99.0 | 31.1 | 0.50 | 0.22 |
| E9 | 37.5 | 4.4 | 486 | 2520 | 96.0 | 28.6 | 0.36 | 0.15 |
| E10 | 37.5 | 4.9 | 265 | 2400 | 97.7 | 33.7 | 0.37 | 0.18 |
| E11 | 37.5 | 5.3 | 143 | 2320 | 98.7 | 37.0 | 0.37 | 0.20 |
| E12 | 37.5 | 5.7 | 81 | 2250 | 99.2 | 40.5 | 0.37 | 0.25 |
| E13 | 25 | 5.2 | 122 | 2560 | 99.0 | 50.7 | 0.25 | 0.25 |

TABLE I-continued

| Ex. | Fraction loading* | pH | Residual [Ag] µg/ml | Residual [Na] µg/ml | % uptake Ag | % uptake Na | x | y |
|---|---|---|---|---|---|---|---|---|
| E14 | 25 | 5.4 | 90 | 2390 | 99.2 | 54.2 | 0.25 | 0.29 |
| E15 | 25 | 5.9 | 47 | 2330 | 99.6 | 55.5 | 0.25 | 0.31 |

*fraction loading refers the equivalents of $Ag^+$ per equivalents host wherein the exchange capacity of $\alpha$-$Zr(HPO_4)_2 \cdot H_2O$ is taken as 6.64 meq/g.

The data of Table I indicate that the fraction uptake of silver ion by $Zr(HPO_4)_2 \cdot H_2O$ increases as the pH of the suspension is increased, and that $Zr(HPO_4)2 \cdot H_2O$ sequesters silver ion more effectively at higher pH. At a pH of 4.4 and above, more than 95% of the added silver ion is absorbed by $Zr(HPO_4)_2 \cdot H_{2.}$ At a pH of about 5.0 and above, more than 98% or even 99% of added silver is typically absorbed. These results can be understood if one considers the ion exchange processes described by equations (1) and (2) above. The data of Table I also indicates that the greatest percent uptake silver ion (highest sequesterability of the host) occurs when x and y are in accordance with the invention.

Photographic Element Examples 16–19

Control example 16C (No included silver ion exchange compound). A photographic element was prepared according to the coating structure shown below. Photosensitive Layer 2 comprised a red sensitized high chloride (>90% chloride) silver halide emulsion. Cyan coupler CC-2 was delivered via an oil-in-water dispersion prepared by conventional means.

| Coating Structure | | |
|---|---|---|
| Layer 3 | GEL SUPERCOAT | |
| | Gelatin | 1.077 g.m$^{-2}$ |
| | Hardener* | 0.112 g.m$^{-2}$ |
| | Alkanol XC ® | 0.026 g.m$^{-2}$ |
| | FT-248 | 0.010 g.m$^{-2}$ |
| Layer 2 | PHOTOSENSITIVE LAYER | |
| | Gelatin | 1.399 g.m$^{-2}$ |
| | Coupler CC-2 | 0.245 g.m$^{-2}$ |
| | Tinuvin 328 ® | 0.337 g.m$^{-2}$ |
| | CS-2 | 0.138 g.m$^{-2}$ |
| | CS-3 | 0.414 g.m$^{-2}$ |
| | Fog-1 | 0.00229 g.m$^{-2}$ |
| | Fog-2 | 0.000229 g.m$^{-2}$ |
| | Red-sensitive emulsion | 0.173 g.m$^{-2}$ (as Ag) |
| Layer 1 | GEL PAD | |
| | Gelatin | 3.230 g.m$^{-2}$ |
| Support | Resin Coated Paper | |

*Hardener = bis(vinylsulphonylmethane)
FOG1 = p-toluenethiosulfonate potassium salt
FOG2 = p-toluenesulfinate sodium salt
CC-2

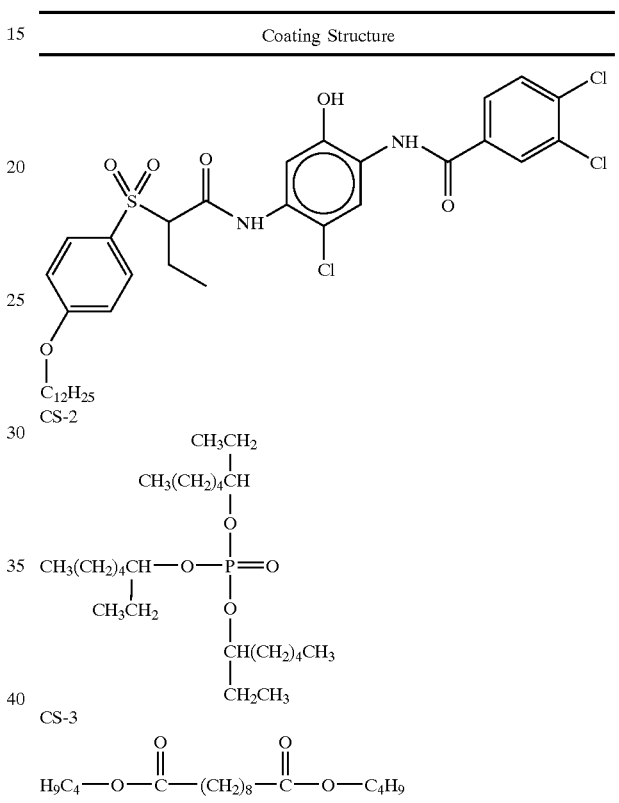

-continued
Coating Structure

CS-2

CS-3

$H_9C_4$—O—C(=O)—$(CH_2)_8$—C(=O)—O—$C_4H_9$

Invention Example 17E

A photographic element was prepared identically as in comparison example 16C, except that a silver ion sequester/release agent dispersion prepared as follows was included in the photosensitive layer to give an additional 0.0043 g/m$^2$ silver ion. Preparation of Silver ion Sequester/Release dispersion: Into a 1.0 L container bar-shaker was placed 100.00 g of amorphous $Zr(HPO_4)_2 \cdot H_2O$ (from MEI corporation) in 200.0 g of distilled water. To this suspension was added slowly, (over 5') of 133 ml (146.3 g) of 2.5 M NaOH. The pH was 7.7 @34° C. 50.0 g of gelatin was added, cold soaked and melted at 40° C. Then, with stirring, were simultaneously added: 166 ml (208.3 g) of 1.5 M AgNO3 at 8.3 ml/min for 20 minutes and 330.0 ml (336.3 g) 0.25 M NaOH at 16.5 ml/min for 20 minutes. The pH was maintained at about 5.5–6.0 throughout the addition. The contents were then allowed to stir overnight @40° C. The final pH was 5.20. The reaction mixture was than chill set with stirring and refrigerated. Silver analysis indicated the final dispersion to be 2.71 weight % Ag. The final silver ion sequester and release agent material composition was calculated to be $Zr(H_{0.41}Ag_{0.37}Na_{0.22}PO_4)_2 \cdot H_2O$.

Comparison Example 18C

A photographic element was prepared identically as in comparison example 16C, except that commercial silver zirconium phosphate compound ALPHASAN RC2000® (Milliken Chemical) was included in the photosensitive layer to give an additional 0.0043 g/m² silver ion. Analysis of the commercial compound for Ag and Na indicated 9.4% silver and 0.9% Na.

Comparison Example 19C

A photographic element was prepared identically as in comparison example 16C, except that silver ion exchanged zeolite (Aldrich Chemical Company) of the formula $Ag_{84}Na_2[(AlO_2)_{86}(SiO_2)_{106}] \cdot xH_2O$ was included in the photosensitive layer to give an additional 0.0043 g/m² silver ion.

Samples of each photographic element of examples 16–19 were given a neutral exposure and were processed according to the following scheme: Development was carried out in color paper developer formulation Developer-1 at 35° C. for varied times; Bleach/Fix was carried out in KODAK EKTA COLOR Prime Bleach/Fix at 35° C. for 45 seconds; Wash was carried out in water at 35° C. for 90 seconds.

| Color paper developer formulation Developer-1. | |
| --- | --- |
| Developer Component | Concentration |
| Triethanolamine 100% | 5.5 mL |
| Versa TL-73 | 0.15 mL |
| Potassium Sulfite (45%) | 0.5 mL |
| BD-89 | 5.64 mL |
| Blankophor REU 170 | 0.82 g |
| Lithium Sulfate | 2.00 g |
| KODAK Anti-Calcium No. 5 | 0.60 mL |
| Potassium Chloride | 5.72 g |
| Potassium Bromide | 0.024 g |
| KODAK Color Developing Agent, CD-3 | 2.0 g |
| Potassium Carbonate | 25.0 g |
| Water to make (adjust pH to 10.10) | 1 L |

For each of the example coatings Dmin (minimum density above zero), Speed (measured at 0.8 density point of the D log E curve), and Speed change upon keeping (for coating samples which were stored for 4 weeks at 120° F. and are compared to coating samples kept at 0° F.) were measured, and the results are presented in Table II.

TABLE II

| Example. | Dmin | Speed change from Ex. 16C | Speed Change upon Keeping |
| --- | --- | --- | --- |
| 16C (control) | 0.091 | — | +0.03 |
| 17E (invention) | 0.092 | +0.10 | +0.04 |
| 18C (comparison) | 0.102 | +0.09 | +0.08 |
| 19C (comparison) | 0.093 | +0.08 | +0.06 |

From Table II, the inventive example shows lower fresh Dmin and better sensitivity (speed increase) when compared to the comparative examples. Further, the inventive examples show improved keeping properties with respect to maintaining speed over time when compared to the comparative examples.

The invention has been described in detail with particular reference to certain preferred embodiments thereof, but it will be understood that variations and modifications can be effected within the spirit and scope of the invention.

What is claimed is:

1. A silver ion sequester and release agent comprising a silver ion exchangeable material of the formula:

$$M(H_{1-x-y}Ag_xM'_y PO_4)_2 \cdot nH_2O;$$

where M is Zr, Ti, Sn, Ge, or Hf or any combination thereof; M' is an Alkali or alkaline earth metal; x is a number from 0.10 to 0.80; y is a number from 0.15 to 0.85; (x+y) is a number from 0.25 to 0.95; and n is a rational number between 0 and 10.

2. A silver ion sequester and release agent according to claim 1 wherein x is between 0.15 and 0.70, y is between 0.15 and 0.50; and (x+y) is between 0.30 and 0.95.

3. A silver ion sequester and release agent according to claim 1 wherein x is between 0.20 and 0.60, y is between 0.20 and 0.50; and (x+y) is between 0.40 and 0.95.

4. A silver ion sequester and release agent according to claim 1, having an average particle size between 0.01 and 10.0 μm.

5. A silver ion sequester and release agent according to claim 1, having an average particle size between 0.05 and 1.0 μm.

6. A silver ion sequester and release agent according to claim 1, where M is Zr.

7. A silver ion sequester and release agent according to claim 1, where M' is Na.

8. A silver ion sequester and release agent according to claim 1, where M is Zr and M' is Na.

9. A process for the preparation of a silver ion sequester and release agent according to claim 1, said process comprising combining in an aqueous medium a crystalline or amorphous metal hydrogen phosphate ion exchange host material of the formula $M(HPO_4)_2 \cdot nH_2O$, where M and n are as defined in claim 1, with less than 2 molar equivalents of silver ions relative to the amount of ion exchange host material such that silver ions are exchanged for protons in the host material, and adding a base compound to the aqueous medium to achieve a pH of at least 4.4 and sequester at least 95% of the combined silver ions into the host material.

10. A process according to claim 9, wherein sufficient base is added to achieve a pH of from 4.4 to 8.0 after combination of the host material and silver ions.

11. A process according to claim 9, wherein sufficient base is added to achieve a pH of at least 5.0.

12. A process according to claim 11, wherein at least 98% of the combined silver ions are sequestered into the host material.

13. A process according to claim 9, wherein sufficient base is added to achieve a pH of at least 5.2.

14. A process according to claim 13, wherein at least 99% of the combined silver ions are sequestered into the host material.

15. A process according to claim 9, where the added base compound comprises NaOH.

16. A process according to claim 15, where M is Zr and M' is Na in the prepared silver ion sequester and release agent.

17. A composition comprising particles of a silver ion sequester and release agent according to claim 1 in an aqueous medium, wherein the composition has a pH of at least 4.4.

18. A composition according to claim 17, wherein the pH is from 4.4 to 8.0.

19. A composition according to claim 17, wherein the pH is at least 5.0.

20. A composition according to claim 17, wherein the pH is at least 5.2.

21. A composition according to claim 17, wherein M is Zr and M' is Na in the silver ion sequester and release agent.

22. A photographic element comprising a support bearing one or more hydrophilic colloid layers including at least one photographic silver halide emulsion layer, wherein one or more layers contain a silver ion sequester and release agent according to claim 1 which sequesters silver ions prior to photographic processing and releases silver ions upon exposure to photographic processing solutions.

23. An element according to claim 22 wherein x is between 0.15 and 0.70, y is between 0.15 and 0.50, and (x+y) is between 0.30 and 0.95.

24. An element according to claim 22 wherein x is between 0.20 and 0.60, y is between 0.20 and 0.50, and (x+y) is between 0.40 and 0.95.

25. An element according to claim 22, wherein the silver ion sequester and release agent has an average particle size between 0.05 and 1.0 μm.

26. An element according to claim 22, wherein M is Zr and M' is Na.

27. An element according to claim 22 wherein the silver ion sequester and release agent is contained in a hydrophilic colloid layer adjacent to a silver halide emulsion layer.

28. An element according to claim 22 wherein the silver ion sequester and release agent is contained in the silver halide emulsion layer.

29. An element according to claim 28 wherein sequestered silver ions are present in the element at a level from about 0.05 to 5 wt%, relative to the weight of silver of the silver halide emulsion of the emulsion layer.

30. An element according to claim 28 wherein sequestered silver ions are present in the element at a level from about 0.05 to 4 wt%, relative to the weight of silver of the silver halide emulsion of the emulsion layer.

31. An element according to claim 28 wherein sequestered silver ions are present in the element at a level from about 0.1 to 3 wt%, relative to the weight of silver of the silver halide emulsion of the emulsion layer.

32. A photographic element according to claim 22 wherein the element comprises a color paper print element and the silver halide emulsion layer comprises a silver halide emulsion comprising greater than 50 mole percent chloride, based on total silver.

33. A photographic element according to claim 32, wherein the silver halide emulsion comprises greater than 90 mole percent chloride, based on total silver.

34. A method of processing a photographic material after exposure comprising contacting a photographic material according to claim 22 with a photographic processing solution having a greater concentration of cations other than silver ions relative to the silver ion sequester and release agent such that a cation concentration gradient is established, and releasing silver ions from the silver ion sequester and release agent by ion exchange with the silver ion sequester and release agent.

* * * * *

UNITED STATES PATENT AND TRADEMARK OFFICE
CERTIFICATE OF CORRECTION

PATENT NO. : 6,689,335 B1
DATED : February 10, 2004
INVENTOR(S) : Joseph F. Bringley et al.

It is certified that error appears in the above-identified patent and that said Letters Patent is hereby corrected as shown below:

Column 15,
Line 16, after the word "about" delete "0.05" and insert -- 0.01 --.

Signed and Sealed this

Twentieth Day of December, 2005

JON W. DUDAS
*Director of the United States Patent and Trademark Office*